US012348938B2

(12) United States Patent
Nakadai et al.

(10) Patent No.: US 12,348,938 B2
(45) Date of Patent: Jul. 1, 2025

(54) ACOUSTIC PROCESSING DEVICE, ACOUSTIC PROCESSING METHOD, AND STORAGE MEDIUM

(71) Applicants: HONDA MOTOR CO., LTD., Tokyo (JP); KOGAKUIN UNIVERSITY, Tokyo (JP)

(72) Inventors: Kazuhiro Nakadai, Wako (JP); Masayuki Takigahira, Wako (JP); Hirofumi Nakajima, Tokyo (JP)

(73) Assignees: HONDA MOTOR CO., LTD., Tokyo (JP); KOGAKUIN UNIVERSITY, Tokyo (JP)

( * ) Notice: Subject to any disclaimer, the term of this patent is extended or adjusted under 35 U.S.C. 154(b) by 176 days.

(21) Appl. No.: 17/899,668

(22) Filed: Aug. 31, 2022

(65) Prior Publication Data

US 2023/0076123 A1 Mar. 9, 2023

(30) Foreign Application Priority Data

Sep. 7, 2021 (JP) ................................ 2021-145441

(51) Int. Cl.
*H04R 3/00* (2006.01)
*H04R 1/40* (2006.01)
(Continued)

(52) U.S. Cl.
CPC ............ *H04R 3/005* (2013.01); *H04R 1/406* (2013.01); *H04S 3/008* (2013.01); *H04S 7/30* (2013.01);
(Continued)

(58) Field of Classification Search
CPC ......... H04R 3/005; H04R 1/406; H04S 3/008; H04S 7/30; H04S 2400/01; H04S 2400/15
(Continued)

(56) References Cited

U.S. PATENT DOCUMENTS

2015/0012269 A1 1/2015 Nakadai et al.
2015/0172842 A1* 6/2015 Nakamura ........... H04R 29/004 381/92
(Continued)

FOREIGN PATENT DOCUMENTS

CN 108375763 8/2018
JP 2015-019124 1/2015
(Continued)

OTHER PUBLICATIONS

Japanese Office Action for Japanese Patent Application No. 2021-145441 mailed May 14, 2024.

*Primary Examiner* — William A Jerez Lora
(74) *Attorney, Agent, or Firm* — Amin, Turocy & Watson, LLP

(57) ABSTRACT

A storage unit stores a first transfer function representing a transfer characteristic of a sound from a sound source for each sound source direction, a sound source direction estimating unit calculates a conversion coefficient of an acoustic signal for each channel in a frequency domain and a spatial spectrum for each sound source direction on the basis of the first transfer function and estimates a sound source direction in which the spatial spectrum becomes a maximum as an estimated sound source direction, a transfer function estimating unit estimates a transfer function for the estimated sound source direction as a second transfer function by normalizing the conversion coefficients among channels, and a transfer function updating unit updates the first transfer function for the estimated sound source direction using the second transfer function.

7 Claims, 8 Drawing Sheets

(51) Int. Cl.
*H04S 3/00* (2006.01)
*H04S 7/00* (2006.01)

(52) U.S. Cl.
CPC ....... *H04S 2400/01* (2013.01); *H04S 2400/15* (2013.01)

(58) Field of Classification Search
USPC ....................................... 381/56, 58, 92, 124
See application file for complete search history.

(56) References Cited

U.S. PATENT DOCUMENTS

| | | | | |
|---|---|---|---|---|
| 2015/0226831 | A1* | 8/2015 | Nakamura | G01S 3/801 367/118 |
| 2017/0092287 | A1 | 3/2017 | Mizumoto et al. | |
| 2020/0077185 | A1* | 3/2020 | Nakadai | H04R 3/005 |
| 2022/0027579 | A1* | 1/2022 | Suzuki | G10L 15/25 |

FOREIGN PATENT DOCUMENTS

| | | |
|---|---|---|
| JP | 2015-119343 | 6/2015 |
| JP | 2016-144044 | 8/2016 |
| JP | 2017-067948 | 4/2017 |

* cited by examiner

ACOUSTIC PROCESSING DEVICE, ACOUSTIC PROCESSING METHOD, AND STORAGE MEDIUM

CROSS-REFERENCE TO RELATED APPLICATION

Priority is claimed on Japanese Patent Application No. 2021-145441, filed Sep. 7, 2021, the content of which is incorporated herein by reference.

BACKGROUND OF THE INVENTION

Field of the Invention

The present invention relates to an acoustic processing device, an acoustic processing method, and a storage medium.

Description of Related Art

Sound source localization and sound source separation are elemental technologies of acoustic signal processing. Sound source localization is a technique for estimating a sound source direction from acoustic signals of multiple channels received using a microphone array. Sound source separation is a technique for extracting components coming from respective sound sources from acoustic signals of multiple channels. In a case in which a plurality of sound sources simultaneously generate sounds such as a case of speech generation in a noisy environment, such techniques are useful when a specific sound is focused on. Sound source localization and sound source separation are applied to various fields such as robot audition, a smart speaker, a communication conference system, and generation of records of proceedings. The robot audition may be used for communication with persons, understanding of an auditory scene, and the like.

In the sound source localization and the sound source separation, a transfer function representing transfer characteristics from a sound source to a sound reception point is used. Since a positional relation between a sound source and a sound reception point is fixed, a transfer function is defined as a static function. Generally, since a transfer function in a real acoustic environment is not known, in most cases, a series of transfer functions are acquired in advance. A transfer function, for example, is acquired by means of calculation using a mathematical model assuming a free sound field (for example, see Japanese Unexamined Patent Publication No. 2016-144044), measurement of a transfer function in different sound source directions in a laboratory, or the like.

SUMMARY OF THE INVENTION

However, a transfer function acquired in advance essentially has a difference from a transfer function measured in a real acoustic environment. For this reason, the performance of the sound source localization and the sound source separation may be markedly degraded. On the other hand, in a case in which a transfer function is measured every time a used acoustic environment changes, burdens relating to time and operations occur. Although a transfer function may have been appropriately measured, the transfer function may easily change in accordance with arrangement of various objects in the acoustic environment. A transfer function may differ also in accordance with indoor environments such as a temperature, an air pressure, and humidity.

An aspect of the present invention is in view of the points described above, and an object thereof is to provide an acoustic processing device, an acoustic processing method, and a storage medium capable of estimating a transfer function changing in a real acoustic environment.

In order to solve the problems described above and achieve the relating object, the present invention employs the following aspects.

(1) According to one aspect of the present invention, there is provided an acoustic processing device including: a storage unit configured to store a first transfer function representing a transfer characteristic of a sound from a sound source for each sound source direction; a sound source direction estimating unit configured to calculate a conversion coefficient of an acoustic signal for each channel in a frequency domain and a spatial spectrum for each sound source direction on the basis of the first transfer function and estimate a sound source direction in which the spatial spectrum becomes a maximum as an estimated sound source direction; a transfer function estimating unit configured to estimate a transfer function for the estimated sound source direction as a second transfer function by normalizing the conversion coefficients among channels; and a transfer function updating unit configured to update the first transfer function for the estimated sound source direction using the second transfer function.

(2) In the aspect (1) described above, the transfer function updating unit may update at least some components of the first transfer function with the components of the second transfer function every predetermined time.

(3) In the aspect (1) or (2) described above, the transfer function updating unit may update the first transfer function when the number of sound sources detected from the acoustic signal is one.

(4) In any one of the aspects (1) to (3) described above, the transfer function estimating unit may normalize amplitudes of the conversion coefficients for the channels using a norm of the conversion coefficients among the channels and normalize phases of the conversion coefficients for the channels using a total sum of the phases of the conversion coefficients among the channels.

(5) In any one of the aspects (1) to (4) described above, the sound source direction estimating unit may calculate a multiplexing signal classification spectrum on the basis of the conversion coefficient and the first transfer function as the spatial spectrum.

(6) In any one of the aspects (1) to (5) described above, the acoustic processing device may further comprise a sound source separating unit configured to set a separation matrix for the estimated sound source direction on the basis of the first transfer function for the estimated sound source direction and sets a vector calculated by applying the separation matrix to an input vector having the conversion coefficients as its elements as an output vector having a sound source component arriving for each sound source as its elements.

(7) According to one aspect of the present invention, there is provided a computer-readable non-transitory storage medium storing a program causing a computer to function as any one of the aspects (1) to (6) described above.

(8) According to one aspect of the present invention, there is provided an acoustic processing method that is a method of an acoustic processing device including a storage unit configured to store a first transfer function representing a transfer characteristic of a sound from a sound source for each sound source direction, the acoustic processing method including: calculating a conversion coefficient of an acoustic signal for each channel in a frequency domain and a spatial spectrum for each sound source direction on the basis of the first transfer function; estimating a sound source direction in which the spatial spectrum becomes a maximum as an estimated sound source direction; estimating a transfer function for the estimated sound source direction as a second transfer function by normalizing the conversion coefficients among channels; and updating the first transfer function for the estimated sound source direction using the second transfer function.

According to the aspects (1), (7), and (8) described above, a transfer function for an estimated sound source direction estimated from an acquired acoustic signal for each channel is estimated as a second transfer function, and the first transfer function is updated using the estimated second transfer function. For this reason, a transfer function that varies in a real acoustic environment can be estimated on the basis of the acquired acoustic signal.

According to the aspect (2) described above, some components of the first transfer function are updated once, and thus the influence of variations and incorrect estimation of the second transfer function is alleviated.

According to the aspect (3) described above, a second transfer function representing a relative transfer characteristic among channels for the estimated sound source direction can be estimated more reliably.

According to the aspect (4) described above, a second transfer function can be estimated by normalizing amplitudes and phases of conversion coefficients among the channels.

According to the aspect (5) described above, a sound source direction can be accurately estimated using a multiplexing signal classification spectrum calculated using the first transfer function in which a real acoustic environment is reflected.

According to the aspect (6) described above, a sound source component coming in an estimated sound source direction can be accurately extracted using a separation matrix calculated using the first transfer function in which a real acoustic environment is reflected.

DETAILED DESCRIPTION OF THE INVENTION

First Embodiment

A first embodiment of the present invention will be described with reference to the drawings.

Figure 1:
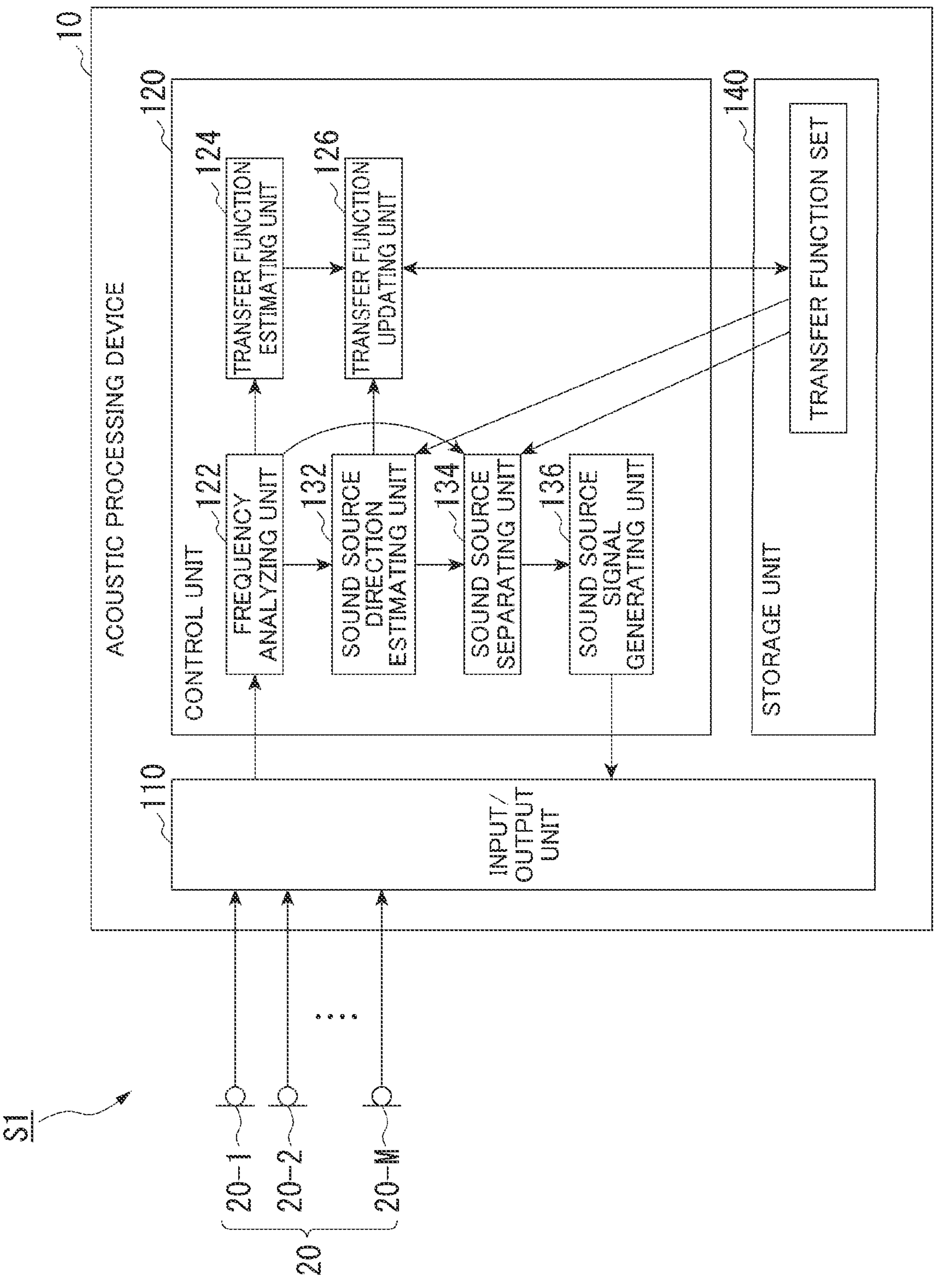
FIG. 1 is a block diagram illustrating an example of a configuration of an acoustic processing system according to a first embodiment.

FIG. 1 is a block diagram illustrating an example of a configuration of an acoustic processing system S1 according to this embodiment.

The acoustic processing system S1 includes an acoustic processing device 10 and a sound reception unit 20.

A transfer function representing transfer characteristics of a sound from a sound source is stored in the acoustic processing device 10 for each sound source direction. The acoustic processing device 10 acquires acoustic signals of multiple channels and calculates a spatial spectrum for each sound source direction on the basis of a conversion coefficient in the frequency domain of an acoustic signal for each channel and the stored transfer function. The acoustic processing device 10 estimates a sound source direction in which the spatial spectrum is a maximum as an estimated sound source direction (sound source localization). The acoustic processing device 10 estimates a transfer function for the estimated sound source direction by performing normalization of calculated conversion coefficients among channels and updates the transfer function for the estimated sound source direction, which has been stored in advance, using the estimated transfer function. A transfer function set including updated transfer functions is used for estimating a sound source direction from an acoustic signal that is newly acquired. Thus, estimation of a sound source direction and update of a transfer function are sequentially repeated.

The acoustic processing device 10 has a function of extracting sound source components transmitted from individual sound sources from acoustic signals of multiple channels acquired using the estimated sound source direction (sound source separation). The acoustic processing device 10 may generate an acoustic signal having an extracted sound source component as a sound source signal. Depending on a technique for a sound source separation process, the acoustic processing device 10 may use a transfer function relating to an estimated sound source direction among transfer functions included in a transfer function set.

In description here, a transfer function stored in the acoustic processing device 10 will be referred to as a “first transfer function”, and a transfer function estimated by the acoustic processing device 10 will be referred to as a “second transfer function” for making a distinction between both the functions.

The acoustic processing device 10 may use one or both sides of an estimated sound source direction and a sound source component and a sound source signal for other processes in its own device or may output them to another device that serves as an output destination (not illustrated; hereinafter it may be referred to as an “output destination device”). For example, The acoustic processing device 10 may estimate presence of an object in the estimated sound source direction as the other process. The acoustic processing device 10 may acquire a generated speech text representing details of generated speech or estimate a speaker by performing a speech recognition process for a sound source component or a sound source signal from a specific sound source direction (speaker). The output destination device serving as an output destination may be an information communication device such as a personal computer (PC) or a multi-functional mobile phone, a measuring device, a monitoring device, or the like.

The sound reception unit 20 has a plurality of microphones 20-1 to 20-M and functions as a microphone array. The number M of the microphones is an integer equal to or larger than 2. The microphones are arranged at different positions and include actuators that receive sound waves coming thereto. The actuator converts a sound wave that has come into an acoustic signal. The converted acoustic signal is output to the acoustic processing device 10 in a wireless or wired manner. Each of the microphones corresponds to a channel of an acoustic signal.

Figure 4:
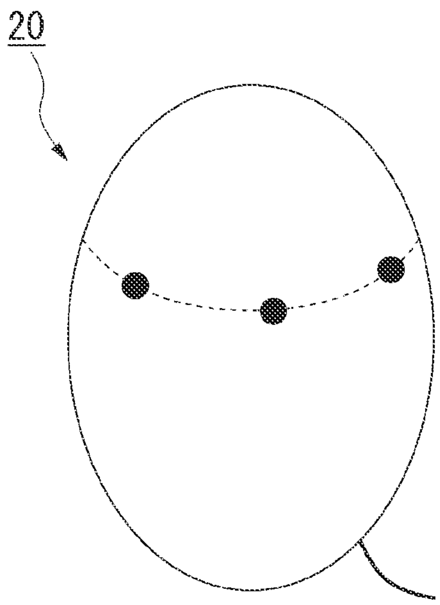
FIG. 4 is a diagram illustrating an example of a sound reception unit.

The arrangement of the plurality of microphones may be fixed or changeable. The positions of the plurality of microphones may be different from each other. In the example illustrated in FIG. 4, 8 microphones are arranged such that spaces from the center are equal on a circumference parallel to a horizontal plane. In FIG. 4, the microphones are denoted by black circles. The 8 microphones are arranged on a side face of a casing and are formed as one microphone array. The casing has a shape having a rotational symmetry with respect to a rotation axis in a vertical direction, a so-called egg shape. The microphone array includes an output interface for aggregating acoustic signals of 8 channels recorded by respective microphones and outputting the acoustic signals to the acoustic processing device 10 in parallel in a wired manner.

Next, an example of the functional configuration of the acoustic processing device 10 according to this embodiment will be described.

The acoustic processing device 10 is configured to include an input/output unit 110, a control unit 120, and a storage unit 140.

The input/output unit 110 is connected to other devices in a wired or wireless manner so that it is able to input and output various kinds of data. The input/output unit 110 outputs acoustic signals of M channels from the sound reception unit 20 to the control unit 120 as input data. For example, the input/output unit 110 outputs estimation information input from the control unit 120 to an output destination device (not illustrated) as output data. For example, the input/output unit 110 may be one of an input/output interface, a communication interface, and the like or a combination thereof.

The control unit 120 performs a process for realizing a function of the acoustic processing device 10, a process for controlling the function, and the like. Although the control unit 120 may be configured using a dedicated member for all the functions or each function, it may be configured as a computer system including a processor such as a central processing unit (CPU) and various kinds of storage media. The processor reads a predetermined program stored in a storage medium in advance and executes a process instructed using various commands described in the read program, thereby realizing the function of the control unit 120.

The control unit 120 is configured to include a frequency analyzing unit 122, a transfer function estimating unit 124, a transfer function updating unit 126, a sound source direction estimating unit 132, a sound source separating unit 134, and a sound source signal generating unit 136. Unless otherwise mentioned, processes of the transfer function estimating unit 124, the transfer function updating unit 126, the sound source direction estimating unit 132, and the sound source separating unit 134 are independently performed for each frequency.

Acoustic signals of M channels are input to the frequency analyzing unit 122 from the sound reception unit 20 through the input/output unit 110. Each of the acquired acoustic signals of the M channels represents a time series (a waveform) of an amplitude for every sample time in the time domain. The frequency analyzing unit 122 performs a frequency analysis for each frame of a predetermined period (for example, 20 ms to 100 ms) on each channel in the time domain and converts each acoustic signal into a conversion coefficient of each frequency in the frequency domain. A set over frequencies of conversion coefficients of the channels represents a frequency spectrum. The frequency analyzing unit 122, for example, can use a technique such as discrete Fourier transform in the frequency analysis. The frequency analyzing unit 122 outputs input information representing a conversion coefficient acquired through conversion to the transfer function estimating unit 124, the sound source direction estimating unit 132, and the sound source separating unit 134.

Input information is input to the transfer function estimating unit 124 from the frequency analyzing unit 122. The transfer function estimating unit 124 estimates a transfer function from a sound source to a microphone corresponding to a channel thereof on the basis of a conversion coefficient for each channel represented in the input information for each frequency. As will be described below, the estimated transfer function can be associated with an estimated sound source direction estimated by the sound source direction estimating unit 132 as a second transfer function. When estimating the second transfer function, for example, the transfer function estimating unit 124 normalizes each of an amplitude and a phase of a conversion coefficient for each channel among channels. In the example represented in Equation (1), an input vector X is divided by a norm |X| thereof, whereby the amplitude of a conversion coefficient is normalized. As the norm, for example, a root-sum-square value can be used. The input vector X is a vector having a conversion coefficient $X_m$ for each channel m at a certain frequency as its element. The normalized amplitude has a real number value equal to or larger than 0 and equal to or smaller than 1. By multiplying conversion coefficients by a complex conjugate of a quotient acquired by dividing a total sum $\Sigma_m X_m$ of the conversion coefficients $X_m$ among channels by an absolute value $|\Sigma_m X_m|$ thereof, phases of the conversion coefficients are normalized. By normalizing the phases, an average value of phases of channels weighted with amplitudes of conversion coefficients of each channel becomes 0. In this embodiment, each transfer function may have a value relativized between channels and may not necessarily be an absolute value. The transfer function estimating unit 124 outputs second transfer function information representing the estimated second transfer function to the transfer function updating unit 126.

$$H' = \frac{X}{|X|} \cdot \left( \frac{\sum_m X_m}{\left| \sum_m X_m \right|} \right)^* \tag{1}$$

The second transfer function information is input from the transfer function estimating unit 124 to the transfer function updating unit 126, and estimated sound source direction information is input from the sound source direction estimating unit 132 to the transfer function updating unit 126. The estimated sound source direction information is information representing a sound source direction estimated by the sound source direction estimating unit 132. The transfer function updating unit 126 identifies a second transfer function for each channel represented by the input second transfer function information for each frequency as a second transfer function corresponding to the estimated sound source direction represented in the estimated sound source direction information. The transfer function updating unit 126 updates the first transfer function corresponding to the estimated sound source direction in a transfer function set stored in the storage unit 140 using the identified second transfer function. For example, the transfer function updating unit 126 substitutes a second transfer function of a frequency and a channel that is an update target as a first transfer function of the frequency and the channel.

Here, when the first transfer function is simply substituted with the second transfer function for each frame, there are cases in which a variation in the substituted first transfer function becomes marked. For example, the first transfer function may be directly influenced by presence/absence of presentation of a sound from a sound source, a temporary change in the acoustic environment, erroneous estimation of a sound source direction, and the like.

Thus, the transfer function updating unit 126 may set a first transfer function after update such that a component of a part of the first transfer function of the frequency and the channel that is an update target is substituted with a component of a part of the second transfer function in one arithmetic operation. For example, by using an exponential smoothing method, the transfer function updating unit 126 performs weighted averaging of a second transfer function H' at that time and a first transfer function $H_E(\theta')$ relating to an estimated sound source direction θ' that is an update target, thereby calculating the first transfer function $H_E(\theta')$ that is newly updated. In the example represented in Equation (2), a weighting coefficient α by which the second transfer function H' is multiplied is a predetermined real number value larger than 0 and smaller than 1. The first transfer function $H_E(\theta')$ before update may be multiplied by a weighting coefficient (1−α). Thus, as the first transfer function $H_E(\theta')$, an average value of transfer functions smoothed to be weighted by the new second transfer function H' over time can be acquired. The transfer function updating unit 126 stores the new first transfer function $H_E(\theta')$ in the storage unit 140 in association with the estimated sound source direction θ' instead of the original first transfer function $H_E(\theta')$ before update.

$$H_E(\theta')=(1-\alpha)H_E(\theta')+\alpha H' \quad (2)$$

By referring to the transfer function set stored in the storage unit 140, the sound source direction estimating unit 132 calculates a spatial spectrum $S_{sp}(\theta)$ for each frequency using the conversion coefficient of each channel represented in the input information input from the frequency analyzing unit 122. The spatial spectrum may be regarded as an index representing a degree of likelihood of a sound source being present for each direction with reference to the position of the sound reception unit 20. The sound source direction estimating unit 132 can calculate a spatial spectrum using the transfer function set $H_E$, the sound source direction θ, and the input vector X. As represented in Equation (3), the sound source direction estimating unit 132 estimates a direction in which the spatial spectrum is a maximum as an estimated sound source direction θ'. A specific example of the technique for calculating a spatial spectrum will be described below. The sound source direction estimating unit 132 outputs estimated sound source direction information representing the estimated sound source direction to the transfer function updating unit 126 and the sound source separating unit 134.

$$\theta' = \underset{\theta}{\operatorname{argmax}}(S_{sp}(H_E, X, \theta)) \quad (3)$$

There are cases in which the sound source direction estimating unit 132 detects a plurality of directions in which the spatial spectrum $S_{sp}(\theta)$ is a maximum and is larger than a predetermined threshold of the spatial spectrum. In such a case, the sound source direction estimating unit 132 may output estimated sound source direction information, which represents a plurality of sound source directions as estimated sound source directions, to the sound source separating unit 134. The reason for this is that a plurality of significant sound sources are estimated to be present.

Only in a case in which one direction in which the spatial spectrum $S_{sp}(\theta)$ is a maximum and is larger than a predetermined threshold of the spatial spectrum is detected, the sound source direction estimating unit 132 may output estimated sound source direction information representing the detected one direction as an estimated sound source direction θ' to the transfer function updating unit 126. As described above, the transfer function updating unit 126 can update a first transfer function $H_E(\theta')$ relating to the one estimated sound source direction θ' notified in the estimated sound source direction information from the sound source direction estimating unit 132 using the second transfer function H'.

In other words, in a case in which two or more directions in which the spatial spectrum $S_{sp}(\theta)$ is the maximum and is larger than the predetermined threshold of the spatial spectrum are detected and in a case in which a direction in which the spatial spectrum $S_{sp}(\theta)$ is the maximum and is larger than the predetermined threshold of the spatial spectrum is not detected, the sound source direction estimating unit 132 does not output estimated sound source direction information to the transfer function updating unit 126. In that case, no estimated sound source direction information is input from the sound source direction estimating unit 132, and the transfer function updating unit 126 stops update of the first transfer function based on the second transfer function estimated from input information input from the frequency analyzing unit 122 by the transfer function estimating unit 124. Although a direction in which the spatial spectrum $S_{sp}(\theta)$ is a maximum and is larger than a predetermined threshold of the spatial spectrum is estimated as a sound source direction, in a case in which two or more sound source directions are detected, sounds coming from a plurality of sound sources are superimposed in a microphone, and thus a ratio of conversion coefficients between channels is not a ratio between transfer functions for a sound source direction relating to one specific sound source. In a case in which a sound source direction is not detected, a sound that is originally significant does not arrive at a microphone from a sound source. Thus, by limiting estimation and update of a transfer function to a case in which the number of detected sound sources is one, deterioration of the estimation accuracy of the transfer function is inhibited. Also in a case in which the number of detected sound sources is two or more, execution of sound source separation in the sound source separating unit 134 is allowed.

Input information is input from the frequency analyzing unit 122 to the sound source separating unit 134, and estimated sound source direction information is input from the sound source direction estimating unit 132 to the sound source separating unit 134. The sound source separating unit 134 extracts a sound source component coming in an estimated sound source direction from the conversion coefficient for each channel represented in the input information. The sound source separating unit 134, for example, refers to the transfer function set $H_E$ stored in the storage unit 140 and calculates a separation matrix $W(H_E, \theta')$ from the transfer function relating to the estimated sound source direction θ'. As represented in Equation (4) as an example, the sound source separating unit 134 multiplies an input vector X by the separation matrix $(H_E, \theta')$ and can calculate an output value Y (a separated sound source) estimated as a sound source component coming from a sound source present in the estimated sound source direction θ' for each frequency. The input vector X includes conversion coefficients for respective channels represented in input information as its elements. In a case in which a plurality of estimated sound source directions are detected, the sound source separating unit 134 can set an output value for each sound source (each estimated sound source direction). The sound source separating unit 134 outputs output information representing an output value set for each frequency for each sound source to the sound source signal generating unit 136.

$$Y=W(H_E,\theta')\cdot X \tag{4}$$

The sound source signal generating unit 136 converts an output value for each frequency represented in the output information input from the sound source separating unit 134 in each sound source into a time series of amplitudes for each sample time in the time domain. When an output value for each frequency in the frequency domain is converted into a time series of amplitudes, the sound source signal generating unit 136 can use a reverse process of the frequency analysis, for example, an inverse discrete Fourier transform. The sound source signal generating unit 136 can generate a sound source signal by connecting a time series of amplitudes acquired for each frame in each sound source between frames. The sound source signal generating unit 136 may output the generated sound source signal to an output destination device through the input/output unit 110 or may store the generated sound source signal in the storage unit 140.

The storage unit 140 is configured to include a storage medium that temporarily or constantly stores various kinds of data. The storage unit 140 stores various kinds of data (including parameters and the like) used by the control unit 120, various kinds of data acquired by the control unit 120 or other functional units (including input data input from the outside, intermediate data during processing, and generated data generated as a result of processing). A transfer function set is stored in the storage unit 140. The transfer function set is configured to include first transfer functions for respective microphones (channels) for each frequency for each sound source direction. As initial values of the transfer function set, transfer functions measured in advance may be used, or transfer functions calculated in advance using a predetermined geometric model may be used. As the geometric model, a planar wave model assuming propagation of a planar wave in a free sound field, a spherical wave model assuming propagation of a spherical wave from a sound source present at a predetermined distance from the sound reception unit 20, or the like may be used. The initial transfer function set $H_T$ represented in Equation (4) as an example includes first transfer functions $H_T(\theta_1)$ to $H_T(\theta_N)$ for each sound source direction at its elements for each channel and each frequency. $H_T(\theta_1)$ and the like represent transfer functions calculated on the basis of a geometric model relating to the sound source direction $\theta_1$. N represents the number of sound source directions. An interval between sound source directions adjacent to each other has a direct influence on the accuracy of sound source directions estimated through sound source localization. As the number of sound source directions becomes larger, improvement of the accuracy of the sound source directions is expected, and the amount of calculation relating to calculation of a spatial spectrum in the sound source localization increases.

$$H_T=[H_T(\theta_1),H_T(\theta_2), \ldots ,H_T(\theta_N)] \tag{5}$$

An arrangement of sound source directions associated with first transfer functions forming a transfer function set, for example, may be a one-dimensional arrangement in which the sound source directions are distributed on a circumference that has the position of the sound reception unit 20 as its center and is parallel to a horizontal plane. In such a case, individual sound source positions are denoted by azimuth angles. The arrangement of sound source positions may be a two-dimensional arrangement in which the sound source directions are distributed on a spherical surface having the position of the sound reception unit 20 as its center. In such a case, a sound source direction is denoted by an azimuth angle and an elevation angle. The transfer function set may be configured to include a first transfer function for each sound source position. In such a case, the arrangement of sound source positions is a three-dimensional distribution in which the sound sources are distributed in a three-dimensional space. A sound source position is denoted by three-dimensional coordinates having the position of the sound reception unit 20 as a reference and corresponds to a combination of a sound source direction and a distance from the reference position. In this embodiment, although a case in which a distribution of sound source positions is a one-dimensional arrangement will be mainly described as an example, the invention can be applied also to a case of a two-dimensional arrangement or a three-dimensional arrangement.

In a case in which the transfer function set is configured to include a first transfer function for each sound source position, the sound source direction estimating unit 132 can estimate a sound source position as information that is an estimation target. The sound source direction estimating unit 132 may calculate a spatial spectrum for each sound source position in place of each sound source direction and identify a sound source position at which the spatial spectrum is a maximum (or the largest). By using the identified sound source position as an estimated sound source position, the transfer function updating unit 126 may update the first transfer function relating to the estimated sound source position using the second transfer function estimated by the transfer function estimating unit 124 using the technique described above.

Example of Sound Source Localization

Next, a Multiple Signal Classification (MUSIC) method will be described as one example of a technique for sound source localization. In the MUSIC method, a spatial spectrum $S_{sp}(\theta)$ is calculated by performing the sequence described below.

The sound source direction estimating unit 132 calculates an input correlation matrix $R_{XX}$ as represented in Equation (6) from an input vector X including calculated conversion coefficients as its elements.

$$R_{XX}=E[X\cdot X^*] \tag{6}$$

In Equation (6), E[ . . . ] represents an expected value of " . . . ". " . . . . *" represents a complex conjugate transpose of a matrix or a vector " . . . ".

The sound source direction estimating unit 132 calculates an eigen value $\delta_p$ and a eigen vector $\xi_p$ of an input correlation matrix $R_{XX}$ for each frequency. The input correlation matrix $R_{XX}$, the eigen value $\delta_p$ and the eigen vector $\xi_p$ have a relation represented in Equation (7).

$$R_{XX}\xi_p=\delta_p=\delta_p\xi_p \tag{7}$$

In Equation (7), p is an integer equal to or larger than 1 and equal to or smaller than M. An order of the indexes p is a descending order of the eigen values $\delta_p$.

The sound source direction estimating unit 132 calculates a spatial spectrum $S_{sp}(\theta)$ represented in Equation (8) as an example on the basis of the transfer function vector H(θ) and the calculated eigen vector $\xi_p$ for each sound source direction. In Equation (8), $D_m$ corresponds to the maximum number of sound sources that can be detected and is a natural number smaller than M set in advance. The transfer function vector H(θ) is an M-dimensional vector including a first transfer function $H_E(\theta)$ for each channel relating to the sound source direction θ as its element.

In other words, Equation (8) represents that the spatial spectrum $S_{sp}(\theta)$ is calculated by normalizing the square of a norm of the transfer function vector H(θ) using a total sum of inner products with the $(D_m+1)$-th to the $D_m$-th eigen vectors $\xi_p$.

$$S_{sp}(\theta)=\frac{|H(\theta)^*\cdot H(\theta)|}{\left|\sum_{p=D_m+1}^{M} H(\theta)^*\cdot\xi_p\right|} \tag{8}$$

The sound source direction estimating unit 132 is not limited to the MUSIC method and may use techniques such as a Beam Forming (BF) method and the like as other example of the technique for the sound source localization accompanying calculation of a spatial spectrum using a transfer function for each sound source direction. In the BF method, as represented in Equation (9), a product of an input vector X and a pseudo inverse matrix of the transfer function vector H(θ) is calculated as a spatial spectrum $S_{sp}(\theta)$. In Equation (9), $\ldots^+$ represents a pseudo inverse matrix of a vector or a matrix . . . .

$$S_{sp}(\theta)=|H(\theta)^+\cdot X| \tag{9}$$

Example of Sound Source Separation

Next, as one example of the technique for sound source separation, a Geometric-constrained High-order Decorrelation-based Source Separation (GHDSS) method will be described. The GHDSS method includes a process of adaptively calculating a separation matrix W such that the cost function J(W) decreases. As represented in Equation (10), the cost function J(W) is a weighted sum of a separation sharpness $J_{SS}(W)$ and a geometric constraint $J_{GC}(W)$.

$$J(W)=\beta J_{SS}(W)+J_{GC}(W) \tag{10}$$

In Equation (10), β represents a weighting coefficient, which is set in advance, indicating a degree of contribution of the separation sharpness $J_{SS}(W)$ to the cost function J(W).

The separation sharpness $J_{SS}(W)$ is an index value represented in Equation (11).

$$J_{SS}(W)=|E(Y\cdot Y^*)-\text{diag}(Y\cdot Y^*)|^2 \tag{11}$$

$|\ldots|^2$ represents a Frobenius norm. The Frobenius norm is a squared sum of element values of a matrix. diag( . . . ) represents a total sum of diagonal elements of a matrix . . . . In other words, the separation sharpness $J_{SS}(W)$ is an index value representing a degree of mixing of a component of another sound source into a sound source component Y of a certain sound source.

The geometric constraint $J_{GC}(W)$ is an index value represented in Equation (12).

$$J_{GC}(W)=|\text{diag}(WD-I)|^2 \tag{12}$$

In Equation (12), I represents a unit matrix. In other words, the geometric constraint $J_{GC}(W)$ is an index value representing a degree of error between a sound source signal that is output and an original sound source signal transmitted from a sound source.

The sound source separating unit 134 extracts a transfer function corresponding to a sound source direction of each sound source represented in estimated sound source direction information from the transfer function set stored in the storage unit 140 and integrates the extracted transfer functions as elements between sound sources and channels, thereby generating a transfer function matrix D. Here, each row and each column respectively correspond to a channel and a sound source (a sound source direction). The sound source separating unit 134 calculates an initial separation matrix $W_{init}$ represented in Equation (13) on the basis of the generated transfer function matrix D.

$$W_{init}=[\text{diag}[D^*D]]^{-1}D \tag{13}$$

In Equation (13), $\ldots^{-1}$ represents an inverse matrix of a matrix . . . . Thus, in a case in which D*D is a diagonal matrix in which all the non-diagonal elements are "0", the initial separation matrix $W_{init}$ is a pseudo inverse matrix of the transfer function matrix D.

As represented in Equation (14), the sound source separating unit 134 subtracts a weighted sum of complex gradients $J'_{SS}(W_t)$ and $J'_{GC}(W_t)$ according to step sizes $\mu_{SS}$ and $\mu_{GC}$ from a separation matrix $W_{t+1}$ at the current time (frame) t, thereby calculating a separation matrix $W_{t+1}$ at a next time t+1.

$$W_{t+1}=W_t-\mu_{SS}J'_{SS}(W_t)-\mu_{GC}J'_{GC}(W_t) \tag{14}$$

In Equation (14), a component $\mu_{SS}J'_{SS}(W_t)+\mu_{GC}J'_{GC}(W_t)$, which is subtracted from the separation matrix $W_t$, corresponds to an update amount ΔW. The complex gradient $J'_{SS}(W_t)$ is derived by differentiating the separation sharpness $J_{SS}$ by an input vector X. The complex gradient $J'_{GC}(W_t)$ is derived by differentiating the geometric constraint $J_{GC}$ by an input vector X.

When the separation matrix $W_{t+1}$ is determined to have converged, the sound source separating unit 134 can set this separation matrix $W_{t+1}$ as a separation matrix $W(H_E,\theta')$. For example, when the Frobenius norm of an update amount ΔW becomes equal to or smaller than a predetermined threshold, the sound source separating unit 134 determines that the separation matrix $W_{t+1}$ has converged. Alternatively, when a ratio of the Frobenius norm of the separation matrix $W_{t+1}$ to the Frobenius norm of the update amount ΔW becomes equal to or smaller than a predetermined threshold of the ratio, the sound source separating unit 134 may determine that the separation matrix $W_{t+1}$ has converged.

The sound source separating unit 134 is not limited to the GHDSS method and can use a technique accompanying calculation of a separation matrix based on a transfer function relating to an estimated sound source direction, for example, a BF method as another technique for sound source separation. The BF method is a technique for employing a pseudo inverse matrix $H^+(\theta')$ of the transfer function vector $H(\theta')$ relating to the estimated sound source direction θ' estimated by the sound source direction estimating unit 132 as a separation matrix.

Acoustic Processing

Figure 2:
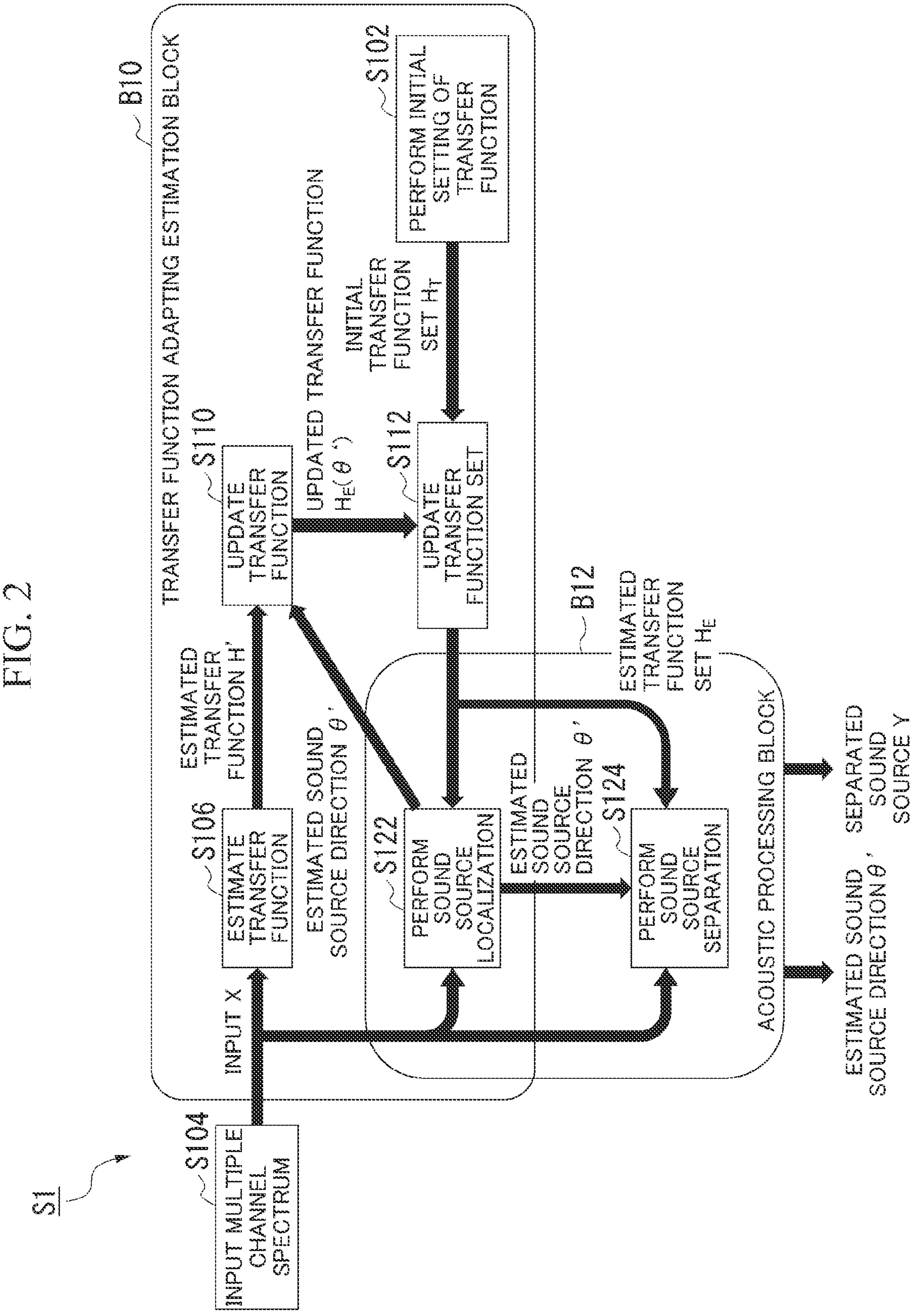
FIG. 2 is a data flowchart illustrating an example of acoustic processing according to the first embodiment.

Next, acoustic processing according to this embodiment will be described. FIG. 2 is a data flowchart illustrating an example of acoustic processing according to this embodiment. The acoustic processing device 10 according to this embodiment is divided into a transfer function adapting estimation block B10 and an acoustic processing block B12.

In steps described below, Steps S102, S106, S110, and S122 belong to the transfer function adapting estimation block B10. Steps S122 and S124 belong to the acoustic processing block B12. Step S122 belongs to the transfer function adapting estimation block B10 and the acoustic processing block B12 and may be asynchronously performed independently in each block or may be performed synchronously between the blocks.

(Step S102) The control unit 120 acquires an initial value of the transfer function set in advance and stores the acquired transfer function set in the storage unit 140. The control unit 120 calculates a transfer function for each channel and each frequency for each sound source direction, for example, using a predetermined geometric model.

(Step S104) The frequency analyzing unit 122 converts each of acoustic signals of M channels in the time domain into a conversion coefficient in the frequency domain for each frame. The frequency analyzing unit 122 provides input information X representing the conversion coefficient of each channel for the transfer function adapting estimation block B10.

(Step S106) The transfer function estimating unit 124 estimates a second transfer function (estimated transfer function H') on the basis of the conversion coefficient for each channel represented in the input information for each frequency. In estimation of the second transfer function, for example, the relation represented in Equation (1) is used.

(Step S110) The transfer function updating unit 126 updates a first transfer function (updated transfer function $H_E(\theta')$) corresponding to the estimated sound source direction θ' in the transfer function set using the second transfer function. In updating the first transfer function, for example, the relation represented in Equation (2) is used.

(Step S112) The transfer function updating unit 126 stores the first transfer function after update in place of the original first transfer function before update in the transfer function set in the storage unit 140 in association with the estimated sound source direction θ'.

(Step S122) The sound source direction estimating unit 132 calculates a spatial spectrum for each frequency using the conversion coefficient of each channel represented in the input information by referring to the transfer function set.

The sound source direction estimating unit 132 sets a sound source direction in which the spatial spectrum is a maximum as the estimated sound source direction θ'. In determining the estimated sound source direction, for example, a relation represented in Equation (3) is used. (Step S124) The sound source separating unit 134 calculates a separation matrix from the transfer function relating to the estimated sound source direction θ' by referring to the transfer function set. The sound source separating unit 134 calculates an output value (a separated sound source) estimated as a sound source component coming in the estimated sound source direction θ' by multiplying the input vector based on the input information by the separation matrix for each frequency.

Every time the processes of Steps S104 to S124 are repeated for each frame, an output value Y representing the estimated sound source direction θ' and the sound source component can be acquired. The estimated sound source direction θ' and the output value Y may be used for other processes performed by the control unit 120 or may be output to an output destination device and used by the output destination device. The estimated sound source direction θ' and the output value Y may be stored in the storage unit 140 temporarily or constantly.

The control unit 120 or the output destination device, for example, may use the estimated sound source direction θ' for directivity control for acoustic signals of M channels as a target direction or a dead angle. The control unit 120 or the output destination device may acquire any one or all of a generated speech text, a type of sound source, and a speaker, for example, by performing a speech recognition process for an output value Y or a sound source signal based on the output value Y. The control unit 120 or the output destination device may perform interactive processing using information of the generated speech text and the speaker acquired as a result of the speech recognition.

As described above, according to this embodiment, the following advantages can be acquired. (1) For estimating a transfer function, all types of sound sources, not limited to predetermined known test signals (for example, a handclap (an impulse), a time stretched pulse (TSP), and the like), can be used for estimation of a transfer function. (2) A transfer function can be directly updated without calibrating a positional relation between a sound source and each microphone. (3) Adaptive learning of transfer functions can be performed online without accompanying an in-advance process such as calibration. (4) Adaptive learning of transfer functions can be performed in parallel with microphone array processing such as sound source localization and sound source separation.

Second Embodiment

Next, a second embodiment of the present invention will be described. In the following description, differences from the embodiment described above will be focused, and, unless otherwise mentioned, the same reference signs as those of the embodiment described above will be assigned to cite the description thereof. A case in which an acoustic processing system S2 according to this embodiment is configured as a control system or a subsystem of a robot (not illustrated) including an operation mechanism 40 will be described as an example.

Figure 3:
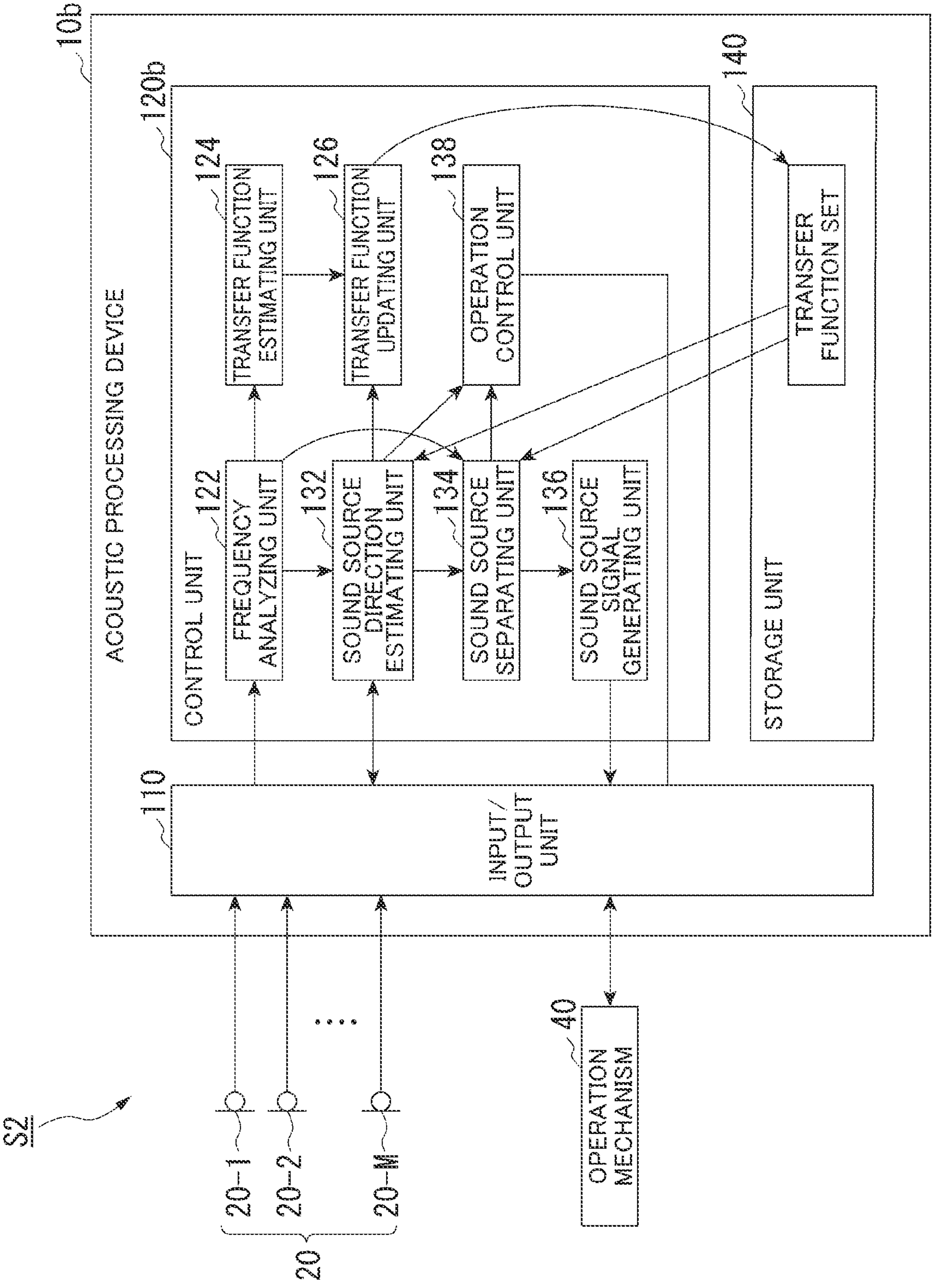
FIG. 3 is a block diagram illustrating an example of a configuration of an acoustic processing system according to a second embodiment.
Figure 5:
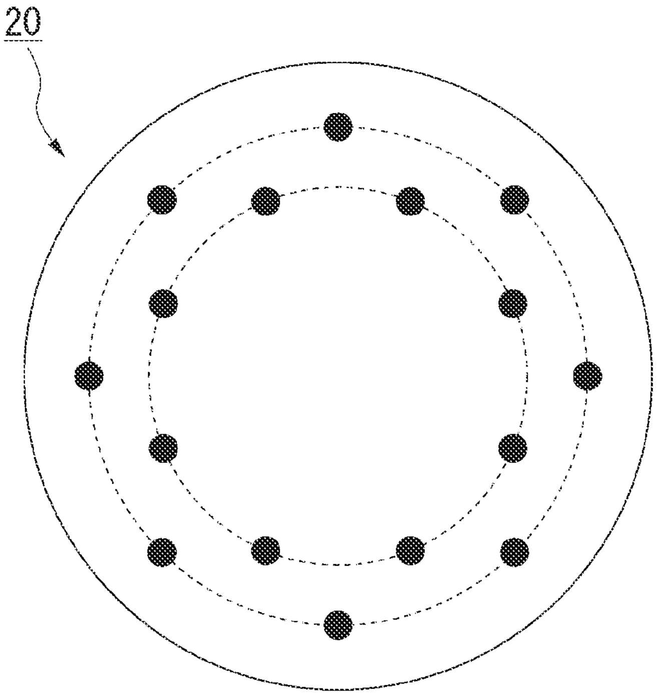
FIG. 5 is a diagram illustrating another example of a sound reception unit.

FIG. 3 is a block diagram illustrating an example of a configuration of the acoustic processing system S2 according to this embodiment. The acoustic processing system S2 is configured to include an acoustic processing device 10*b* and a sound reception unit 20. One or both of the acoustic processing device 10*b* and the sound reception unit 20 may be built in a casing of the robot. In the example illustrated in FIG. 5, a microphone array serving as the sound reception unit 20 is embedded in a head part of a humanoid robot. Each microphone is denoted by a black circle. In this example, the number of microphones is 16. The 16 microphones are arranged on two concentric circles having different radiuses. The 8 microphones are arranged on each concentric circle with intervals of 45°. One group of microphones arranged on one concentric circle have deviations of an azimuth angle of 22.5° from the other microphones arranged on the other concentric circle. Each of the acoustic processing device 10 and 10*b* may use acoustic signals acquired from some microphones among the microphones forming the sound reception unit 20 as acoustic signals of M channels (for example, 15 channels).

Referring back to FIG. 3, the acoustic processing device 10*b* is configured to include an input/output unit 110, a control unit 120*b*, and a storage unit 140. The control unit 120*b* may be configured to include a frequency analyzing unit 122, a transfer function estimating unit 124, a transfer function updating unit 126, a sound source direction estimating unit 132, a sound source separating unit 134, a sound source signal generating unit 136, and an operation control unit 138. An acoustic processing block B12 (FIG. 2) realized by the sound source direction estimating unit 132 and the sound source separating unit 134 may function as a robot auditory functional block realizing robot audition.

The acoustic processing block B12 may identify a type of sound source by performing known voice recognition processing for a sound source component relating to each sound source (sound source localization). As the type of sound source, a speaker who is a person may be identified. The acoustic processing block B12 may notify other devices of estimated sound source direction information representing an estimated sound source direction for a sound source of a specific type or may output a sound source signal converted from output information to other devices for a sound source of a specific type.

The sound source direction estimating unit 132 enables a position of a sound source to be estimated as described above, estimated sound source direction information representing an estimated sound source position is input from the sound source direction estimating unit 132 to the operation control unit 138, and output information representing a sound source component is input from the sound source separating unit 134. The operation control unit 138 controls an operation of the operation mechanism 40 using one or both of the estimated sound source position and the sound source component. The operation control unit 138 may perform self-position estimation and environment map generation (Simultaneous Localization and Mapping (SLAM)), for example, on the basis of the estimated sound source position and the sound source component. By performing sound source localization, the operation control unit 138 can estimate presence of an object (including a person) that is a sound source at the estimated sound source position. The operation control unit 138 may set a presence probability of an object that is a sound source using a predetermined density function model such that it becomes higher as the object is located closer to the estimated sound source position. For example, the operation control unit 138 can generate an environment map by overlapping spatial distributions of presence probabilities of objects each other among the objects. The operation control unit 138 may set an advancement path not to pass through an area of which a presence probability of an object is higher than a predetermined presence probability in planning a path. The advancement path is represented by a target position at each time. The operation control unit 138 may set an estimated direction of a sound source of a predetermined type to be a target direction facing the robot on the front face. The operation control unit 138 outputs a control signal representing one or both of the target position and the target direction at the time point to the operation mechanism 40.

The operation mechanism 40 is built in the casing of the robot and controls an operation of the robot on the basis of a control signal input from the operation control unit 138. The operation mechanism 40 includes a motor (not illustrated) that serves as a power source and an encoder (not illustrated) that detects a position and a direction of its own unit. The motor moves the robot to be closer to the target position or the target direction instructed using the control signal. The encoder sequentially outputs operation information representing a position and a direction detected at the time as an operation state to the operation control unit 138.

Evaluation Test

Next, an evaluation test performed for evaluating effectiveness of the embodiments described above will be described. The evaluation test was performed inside a laboratory forming a space of a rectangular parallelepiped having a vertical length, a horizontal length, and a height of 4, 7, and 3 [m]. A reverberation time $RT_{60}$ in the laboratory is 0.3 [s]. By using evaluation items, the microphone array illustrated in FIG. 4 (hereinafter, referred to as an "egg-type array") and the microphone array illustrated in FIG. 5 (hereinafter, referred to as a "robot built-in array") were used as the sound reception unit 20 with being distinguished from each other. The egg-type array was installed on a table that had a height from a surface of the floor being 0.9 [m] and was installed at an approximate center of the laboratory together with a notebook personal computer and other objects. In a case in which the robot built-in array was used, objects other than a sound source were removed, and only a robot was installed at the center of the laboratory.

Before the evaluation test, next data was prepared. In the egg-type array serving as the sound reception unit 20, an acoustic signal having a sampling frequency of 16 kHz and a bit width of 24 bits per sample for each channel is acquired. For the egg-type array, two kinds of transfer function sets $TF_T^L$ and $TF_T^M$, a white noise $W_T$ recorded during movement in the vicinity of the egg-type array, a generated speech voice $S_T$ recorded during movement in the vicinity of the egg-type array, and a mixed voice $M_T$ were prepared. The mixed voice $M_T$ is used for sound source separation.

When the transfer function set $TF_T^L$ (a low position) was acquired, a sound reproduced on the basis of a TSP signal for each sound source direction was received. Here, sound source positions were set on a circumference parallel to the horizontal plane with intervals of 30° such that a distance from the center of the egg-type array was 0.78 m, and a height from the surface of the floor was 0.78 m. This height corresponds to a lower side of the center of the egg-type array by 15.8°. The transfer function set $TF_T^M$ (a middle position) was acquired also under the same condition as that of the transfer function set $TF_T^L$. Here, the height of sound source positions from the surface of the floor were set to 1.0 m. This height corresponding to an upper side of the center of the egg-type array by 7.3° and corresponds to a height of a mouth of a person sitting on a chair.

When the white noise $W_T$ was acquired, an operation of causing a person to rotate once around the egg-type array clockwise, then reverse the movement direction, and rotate around the egg-type array once counterclockwise with a speaker for reproducing a white noise held is repeated 6 times. Here, a distance from the center of the egg-type array to the position of the speaker (the sound source position), and a height of the position from the surface of the floor were set to 0.78 m and 1.0 m. An entire recording time was 6.8 minutes.

When the generated speech voice $S_T$ was acquired, a male voice selected from a Corpus of Spontaneous Japanese (CSJ) was reproduced from the speaker. A distance of the speaker from the egg-type array and a height of the speaker from the surface of the floor were set similar to those when the white noise $W_T$ was acquired. Here, a recording time of the male voice was set to 20 minutes, and a person is caused to rotate around the egg-type array clockwise three times.

When the mixed voice $M_T$ was acquired, two speakers were installed at azimuths of 0° and 60° with a distance from the egg-type array being 0.78 m and a height from the surface of the floor being 0.78 m.

Two male voices selected from the CSJ are selected as two sound sources, and are simultaneously reproduced by different speakers. A recording time was set to 100 seconds. Furthermore, a white noise was added to the two male voices. Here, a Signal-to-Noise Ratio (SNR) with a voice reproduced from 0 was set to 20 dB.

In the robot built-in array, an acoustic signal of a sampling frequency of 48 kHz and a bit width per sample of 24 bits is acquired for each channel. For the robot built-in array, one type of transfer function set $TF_T^H$ and a white noise $W_H$ acquired by recording during movement in the vicinity of the robot were prepared.

When the transfer function set $TF_T^H$ (a high position) was acquired, a sound reproduced on the basis of the TSP signal was received for each sound source direction. Here, sound source positions were set on a circumference parallel to the horizontal plane with intervals of 5° such that a distance from the center of the robot built-in array was 1.5 m, and a height from the surface of the floor was 1.5 m. This height corresponds to a height of a mouth of a standing person.

When the white noise $W_H$ was acquired, an operation of causing a person to repeatedly rotate around the egg-type array clockwise with a speaker for reproducing a white noise held was performed twice. An entire recording time was 15 minutes.

In addition, a transfer function set $TF_T^G$ was prepared. The transfer function set $TF_T^G$ is configured to include a transfer function calculated in advance using a geometric model for each sound source direction.

Next, a technique for evaluating a transfer function will be described. In this evaluation test, in the proposed method proposed in the embodiment described above, a transfer function estimated using the white noise $W_T$ and transfer functions belonging to the transfer function sets $TF_T^L$, $TF_T^M$, $TF_T^G$ set in advance were evaluated using a Mean Squared Error (MSE). In the evaluation of a transfer function, an MSE between two transfer function sets $TF_i$ and $TF_j$ was calculated for each sound source direction θ by using Equation (15). In Equation (15), M and F respectively represent the number of microphones and the number of frequency bins, and m and f are indices of a microphone (channel) and a frequency. In the example represented in Equation (15), estimated errors relating to individual channels and frequencies are averaged among the channels and the frequencies. Here, a transfer function set formed from transfer functions estimated using the white noise $W_T$ was substituted into $TF_i$, and each of the transfer function sets $TF_T^L$, $TF_T^M$, and $TF_T^G$ was substituted into $TF_j$.

$$MSE_{ij}(\theta) = \frac{1}{MF}\sum_m\sum_f |TF_i(m, f, \theta) - TF_f(m, f, \theta)|^2 \tag{15}$$

Figure 6:
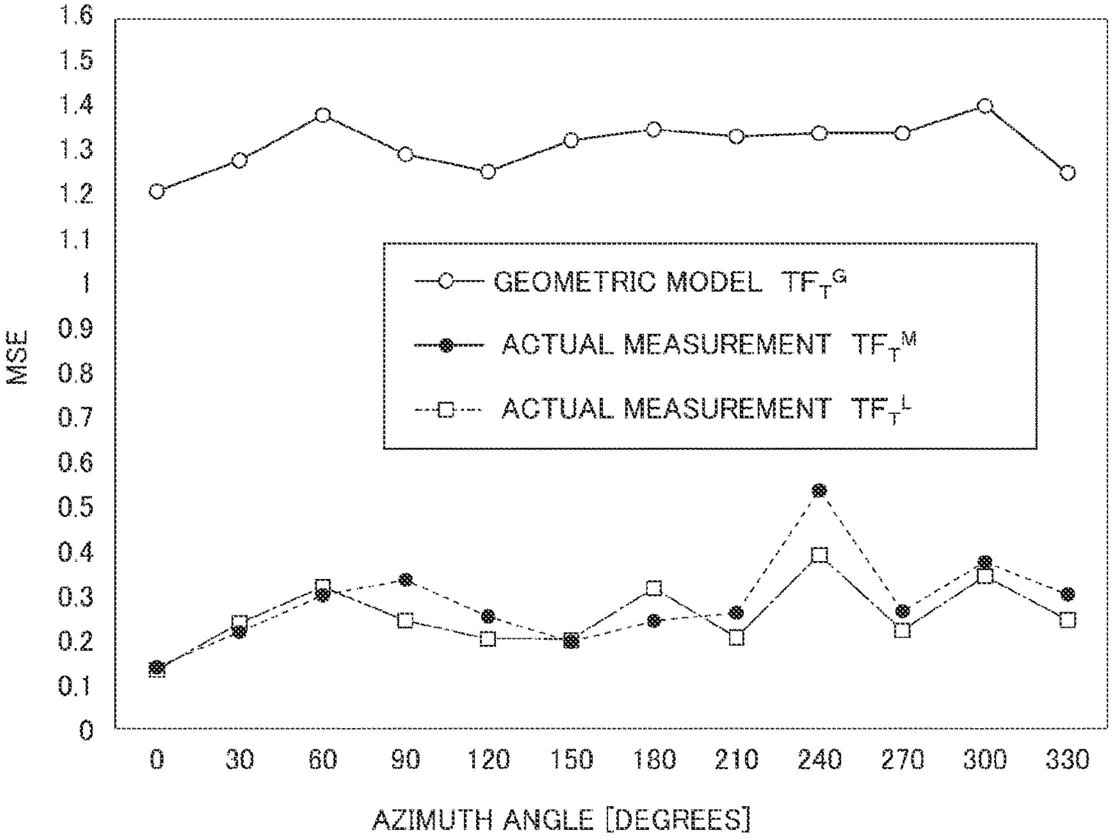
FIG. 6 is a diagram illustrating an example of evaluation results of transfer functions.

FIG. 6 is a diagram illustrating an example of evaluation results of transfer functions. FIG. 6 illustrates estimated transfer function sets and an MSE for each of transfer function sets $TF_T^L$, $TF_T^M$, and $TF_T^G$ for each sound source direction. The MSE relating to the transfer function set $TF_T^G$ is larger than MSE's relating to the other transfer function sets $TF_T^L$ and $TF_T^M$. This represents that the estimated transfer function is closer to an actually-measured transfer function than the transfer function using the geometric model. In other words, it is proved that a transfer function adapted to a real acoustic environment is estimated using this proposed method. Here, a significant difference in the MSE is not recognized between the transfer function sets $TF_T^L$ and $TF_T^M$. Since the sound source is manually moved, the height of the sound source cannot be accurately controlled, which is presumed to be one factor thereof.

Next, a technique for evaluating sound source localization will be described. In this evaluation test, a localization error ($L_E$) was calculated as an evaluation metric by using a transfer function set of transfer functions calculated using a geometric model, a transfer function set of transfer functions estimated using the white noise $W_H$ in accordance with this proposed method, and a transfer function set $TF_T^H$ of measured transfer functions. As represented in Equation (16), the localization error $L_E$ is a ratio of the number $N_E$ of frames in which a localization error has occurred to the number $N_T$ of all the frames of an effective acoustic signal (power exceeds a predetermined threshold (for example, −5 dB, −10 dB, or the like)) used for the evaluation. As a metric for localization error, a sound source direction was estimated in the sound source localization by the sound source direction estimating unit 132 using the known Delay-and-Sum (DS) method.

$$L_E = \frac{N_E}{N_T} \tag{16}$$

Figure 7:
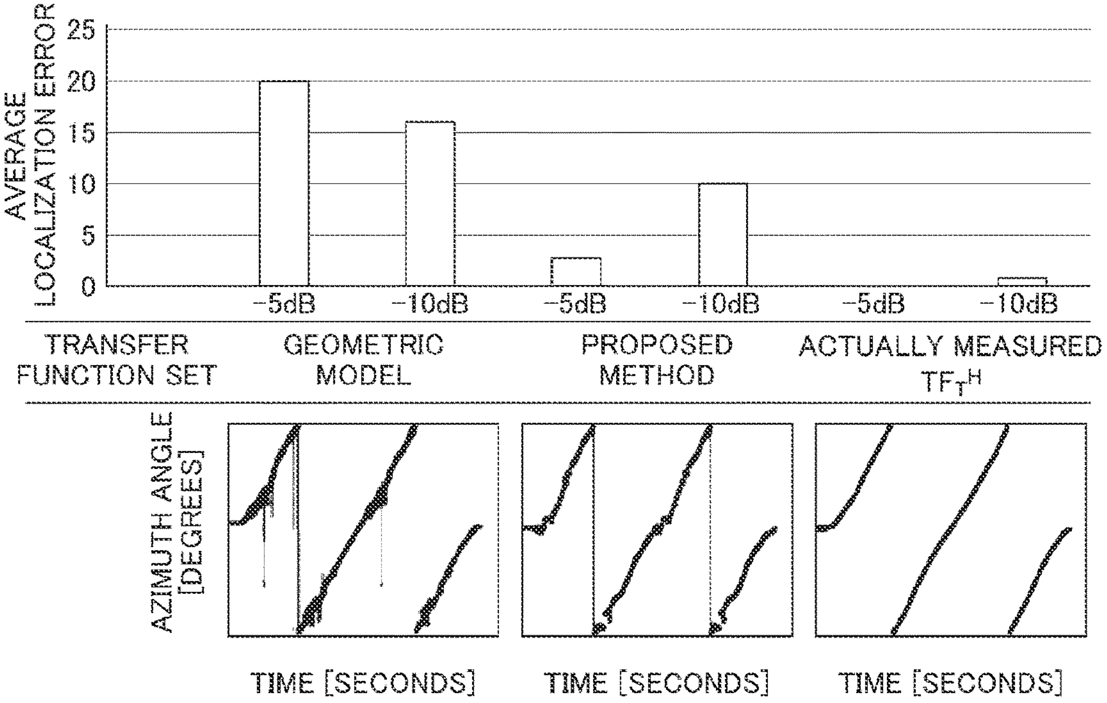
FIG. 7 is a diagram illustrating an example of evaluation results of sound source localization.

FIG. 7 is a diagram illustrating an example of evaluation results of sound source localization. In FIG. 7, for each of the geometric model, this proposed method, and the transfer function set $TF_T^H$, average localization errors are represented on an upper stage, and estimated sound source directions are represented. The average localization error decreases in order of the geometric model, this proposed method, and the transfer function set $TF_T^H$. According to the transfer function set $TF_T^H$, the average localization error becomes almost zero. According to the transfer function set $TF_T^H$, the estimated sound source direction reliably follows a real sound source direction. A deviation in the sound source direction estimated using this proposed method is inhibited more than that of the geometric model. This proves that, by accurately estimating the transfer function using this proposed method, the accuracy of sound source localization can be improved.

In this proposed method and the transfer function set $TF_T^H$, the average localization error is lower in a case in which the threshold is set to −5 dB than in a case in which the threshold is set to −10 dB. This indicates that, in a case in which a sufficient signal intensity is secured, a significant signal component is included, and thus an influence according to surrounding noise can be inhibited.

Next, a technique for evaluating sound source separation will be described. In this evaluation test, the sound source separating unit 134 performs sound source separation for a mixed voice $M_T$ using each of the GHDSS method, the DS method, a Linear Constrained Minimum Variance (LCMV) method, a NULL method (a null beamformer), and a Minimum Variance Distortionless Response (MVDR) method. Such techniques are classified as below in accordance with characteristics of beamforming used for extracting a sound source component from a sound source. The DS method and the NULL method are featured to have fully-fixed beamforming. The MVDR method is featured to have semi-fixed beamforming. The LCMV method and the GHDSS method are featured to have adaptive beam forming.

In this evaluation test, for each technique, a Signal-to-Distortion Ratio (SDR) and a Signal-to-Interference Ration (SIR) were used as evaluation metrics for each of the transfer function set of transfer functions calculated using the geometric model, the transfer function set of transfer functions estimated using the white noise $W_H$, and the transfer function set $TF_T^M$ relating to an egg-type array. The SDR and the SIR can be calculated respectively using Equations (17) and (18).

$$SDR(s)=10\log_{10}(\|s_{target}\|^2/\|e_{residue}\|^2) \quad (17)$$

$$SDR(s)=10\log_{10}(\|s_{target}\|^2/\|e_{interf}\|^2) \quad (18)$$

In Equations (17) and (18), $s_{target}$ represents a target sound source signal of a clean sound source, that is, an original sound source component among sound source signals s acquired through sound source separation. $e_{residue}$ corresponds to a residual signal acquired by subtracting a target sound source signal from sound source signals s acquired through sound source separation, that is, a residual noise term. $e_{interf}$ represents an interference component included in the residual signal $e_{residue}$. In this evaluation test, differences in the SDR and the SIR acquired from a sound source signal acquired through sound source separation and a received raw acoustic signal were evaluated as improvements of the SDR and the SIR.

Figure 8:
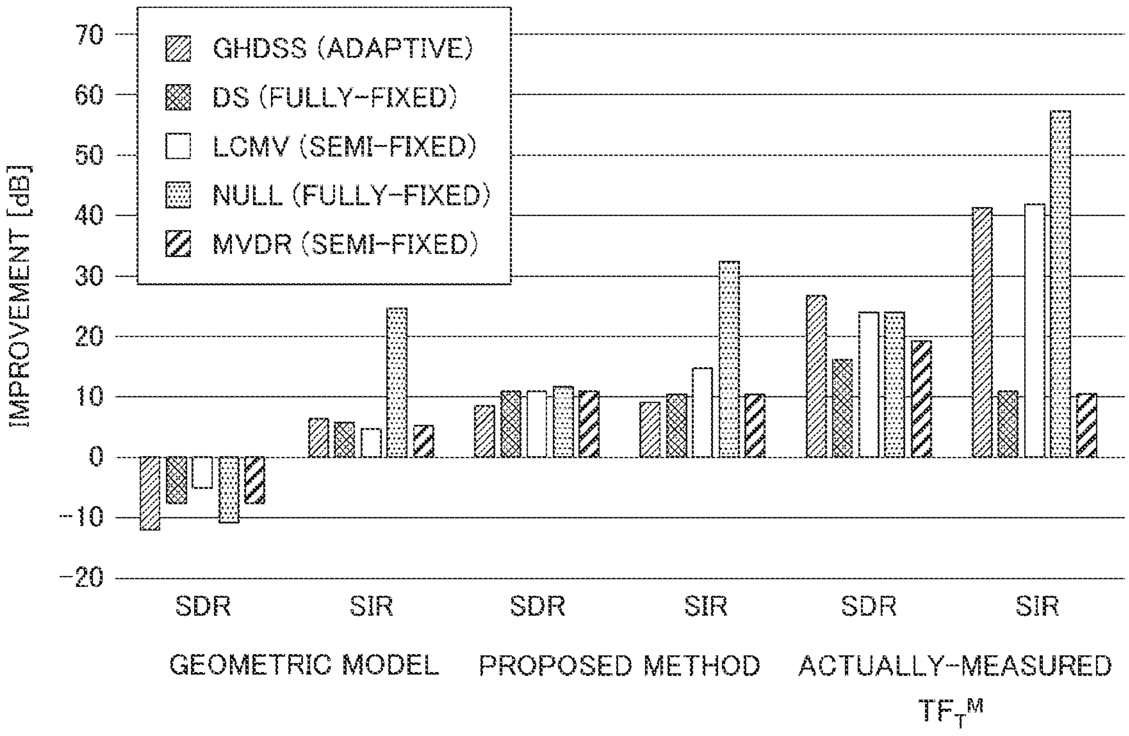
FIG. 8 is a diagram illustrating an example of evaluation results of sound source separation.

FIG. 8 is a diagram illustrating an example of evaluation results of sound source separation. In FIG. 8, improvements of the SDR and the SIR are represented for each technique for sound source separation for each of the geometric model, this proposed method, and the transfer function set $TF_T^M$. The improvements of the SDR and the SIR are the most superior in the enter transfer function set $TF_T^M$ and is lowered in order of this proposed method and the geometric model. It is illustrated that, according to a transfer function estimated using this proposed method, a sound source component having higher quality than that of a transfer function calculated using the geometric model can be extracted also for any technique for sound source separation. In the geometric model, the improvement of the SDR rather becomes negative. Particularly, a component of a voice transmitted from a sound source installed at 0° tends to be not sufficiently separated from a voice transmitted from a sound source installed at 60° and a white noise. Such a tendency commonly occurs regardless of a technique for sound source separation.

Figure 9:
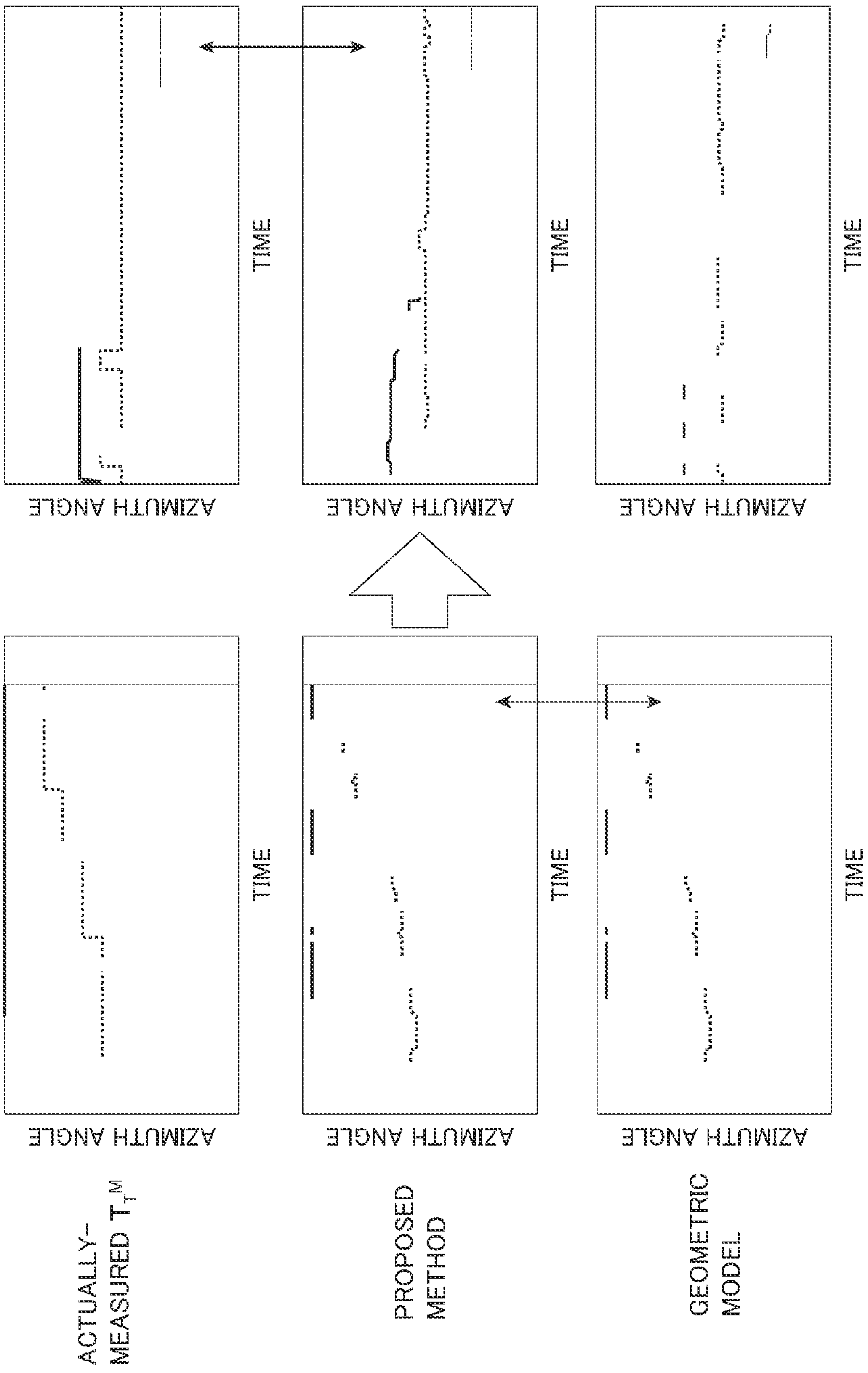
FIG. 9 is a diagram illustrating one execution example of sound source localization and sound source separation.
Figure 10:
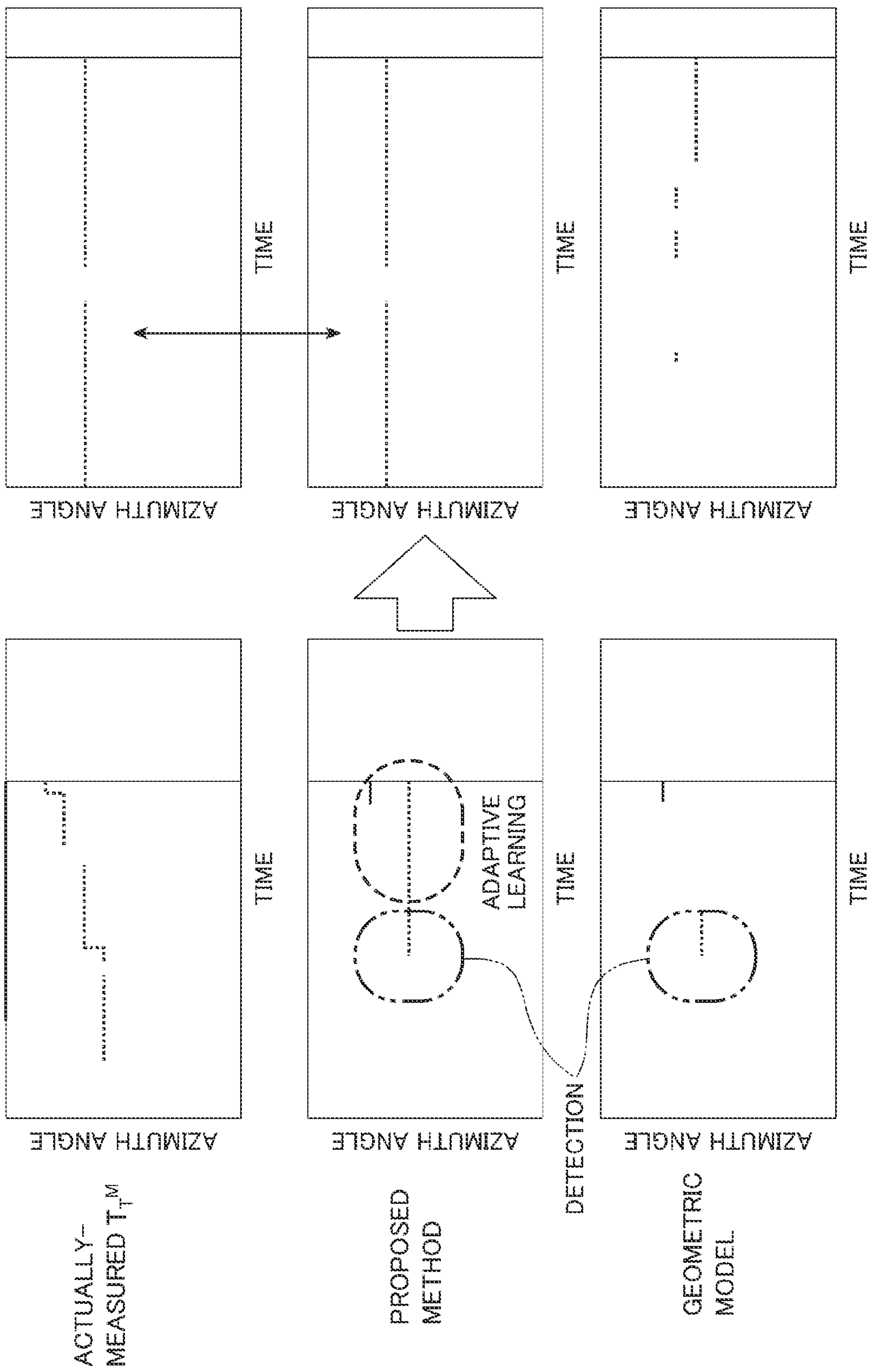
FIG. 10 is a diagram illustrating another execution example of sound source localization and sound source separation.

Next, an example of a sound source direction for each sound source estimated through sound source localization and sound source separation for each of the geometric model, this proposed method, and the transfer function set $TF_T^M$ will be described. FIGS. 9 and 10 illustrate changes in a sound source direction over time for each of two trial periods (laps). In the execution example illustrated in FIG. 9, a calibration period using a white noise $W_T$ explicitly for 6.8 seconds is provided between two trial periods in this proposed method. Here, the acoustic processing device 10 is not caused to update a transfer function simultaneously with execution of sound source localization and sound source separation, and a transfer function set including a sound source direction estimated using the geometric model was set as an initial value of the transfer function set. In the first trial period, changes in the estimated sound source direction over time according to this proposed method represents changes over time that are almost similar to those of an estimated sound source direction according to the geometric model, and there is a significant difference from the estimated sound source direction according to the transfer function set $TF_T^M$.

In contrast to this, in the second trial period, an estimated sound source direction according to this proposed method is closer to the tendency of changes in the estimated sound source direction according to the transfer function set $TF_T^M$ than that of the estimated sound source direction according to the geometric model. This also represents that more accurate sound source localization and sound source separation can be realized by using a transfer function estimated under a real acoustic environment.

In the execution example illustrated in FIG. 10, a calibration period is not provided between two trial periods, and the acoustic processing device 10 is causes to update a transfer function using this proposed method in parallel with sound source localization and sound source separation. Here, a transfer function set including an estimated sound source direction according to the geometric model was set as an initial value of the transfer function set. In a first trial period, in this proposed method, a sound source direction similar to that of the geometric model is detected, and a sound source direction that is not detected using the geometric model in accordance with elapse of time is detected. Here, there is a significant difference from the estimated sound source direction according to the transfer function set $TF_T^M$. In a second trial period, the estimated sound source direction according to this proposed method is almost similar to the estimated sound source direction according to the transfer function set $TF_T^M$. This represents that accurate sound source localization and sound source separation are realized in accordance with progress of adaptive learning of transfer functions.

As described above, an acoustic processing device 10, 10*b* according to this embodiment includes: a storage unit 140 configured to store a first transfer function representing a transfer characteristic of a sound from a sound source for each sound source direction and a sound source direction estimating unit 132 configured to calculate a conversion coefficient of an acoustic signal for each channel in a frequency domain and a spatial spectrum for each sound source direction on the basis of the first transfer function and estimate a sound source direction in which the spatial spectrum becomes a maximum as an estimated sound source direction. In addition, the acoustic processing device 10, 10*b* includes a transfer function estimating unit 124 configured to estimate a transfer function for the estimated sound source direction as a second transfer function by normalizing the conversion coefficients among channels and a transfer function updating unit 126 configured to update the first transfer function for the estimated sound source direction using the second transfer function.

According to this configuration, a transfer function for an estimated sound source direction estimated from an acquired acoustic signal for each channel is estimated as a second transfer function, and the first transfer function is updated using the estimated second transfer function. For this reason, a transfer function that varies in a real acoustic environment can be estimated on the basis of the acquired acoustic signal.

The transfer function updating unit 126 may update at least some components of the first transfer function with some components of the second transfer function every predetermined time.

According to this configuration, some components of the first transfer function are updated once, and thus the influence of variations and incorrect estimation of the second transfer function is alleviated.

The transfer function updating unit 126 may update the first transfer function when the number of sound sources detected from the acquired acoustic signal is one.

According to this configuration, a second transfer function representing a relative transfer characteristic among channels for the estimated sound source direction can be estimated more reliably.

The transfer function estimating unit 124 may normalize amplitudes of the conversion coefficients for the channels using a norm of the conversion coefficients among the channels and normalize phases of the conversion coefficients for the channels using a total sum of the phases of the conversion coefficients among the channels.

According to this configuration, a second transfer function can be estimated by normalizing amplitudes and phases of conversion coefficients among the channels.

The sound source direction estimating unit 132 may calculate a multiplexing signal classification spectrum on the basis of the conversion coefficient and the first transfer function as the spatial spectrum.

According to this configuration, a sound source direction can be accurately estimated using a multiplexing signal classification spectrum calculated using the first transfer function in which a real acoustic environment is reflected.

The acoustic processing device 10, 10*b* may further include a sound source separating unit 134 setting a separation matrix for the estimated sound source direction on the basis of the first transfer function for the estimated sound source direction and setting a vector calculated by applying the separation matrix to an input vector having the conversion coefficients as its elements as an output vector having a sound source component arriving for each sound source as its elements.

According to this configuration, a sound source component coming in an estimated sound source direction can be accurately extracted using a separation matrix calculated using the first transfer function in which a real acoustic environment is reflected.

As above, although one embodiment of the present invention has been described with reference to the drawings, a specific configuration is not limited to that described above, and various changes in design and the like can be made within a range not departing from the concept of the present invention.

What is claimed is:

1. An acoustic processing device comprising:

a storage unit configured to store a first transfer function representing a transfer characteristic of a sound from a sound source for each sound source direction;

a sound source direction estimating unit configured to calculate a conversion coefficient of an acoustic signal for each channel in a frequency domain and a spatial spectrum for each sound source direction on the basis of the first transfer function and estimate a sound source direction in which the spatial spectrum becomes a maximum as an estimated sound source direction;

a transfer function estimating unit configured to estimate a transfer function for the estimated sound source direction as a second transfer function by normalizing the conversion coefficients among channels; and a transfer function updating unit configured to update the first transfer function for the estimated sound source direction using the second transfer function, wherein the transfer function estimating unit normalizes amplitudes of the conversion coefficients for the channels using a norm of the conversion coefficients among the channels and normalizes phases of the conversion coefficients for the channels using a total sum of the phases of the conversion coefficients among the channels.

2. The acoustic processing device according to claim 1, wherein the transfer function updating unit updates at least some components of the first transfer function with the components of the second transfer function every predetermined time.

3. The acoustic processing device according to claim 1, further comprising a sound source separating unit configured to set a separation matrix for the estimated sound source direction on the basis of the first transfer function for the estimated sound source direction and sets a vector calculated by applying the separation matrix to an input vector having the conversion coefficients as its elements as an output vector having a sound source component arriving for each sound source as its elements.

4. The acoustic processing device according to claim 1, wherein the transfer function updating unit updates the first transfer function when the number of sound sources detected from the acoustic signal is one, otherwise, the transfer function updating unit stops update of the first transfer function.

5. A computer-readable non-transitory storage medium storing a program causing a computer to function as the acoustic processing device according to claim 1.

6. An acoustic processing device comprising:

a storage unit configured to store a first transfer function representing a transfer characteristic of a sound from a sound source for each sound source direction;

a sound source direction estimating unit configured to calculate a conversion coefficient of an acoustic signal for each channel in a frequency domain and a spatial spectrum for each sound source direction on the basis of the first transfer function and estimate a sound source direction in which the spatial spectrum becomes a maximum as an estimated sound source direction;

a transfer function estimating unit configured to estimate a transfer function for the estimated sound source direction as a second transfer function by normalizing the conversion coefficients among channels; and a transfer function updating unit configured to update the first transfer function for the estimated sound source direction using the second transfer function, wherein the sound source direction estimating unit calculates a multiplexing signal classification spectrum on the basis of the conversion coefficient and the first transfer function as the spatial spectrum.

7. An acoustic processing method that is a method of an acoustic processing device including a storage unit configured to store a first transfer function representing a transfer characteristic of a sound from a sound source for each sound source direction, the acoustic processing method comprising:

calculating a conversion coefficient of an acoustic signal for each channel in a frequency domain and a spatial spectrum for each sound source direction on the basis of the first transfer function;

estimating a sound source direction in which the spatial spectrum becomes a maximum as an estimated sound source direction;

estimating a transfer function for the estimated sound source direction as a second transfer function by normalizing the conversion coefficients among channels; and updating the first transfer function for the estimated sound source direction using the second transfer function, wherein amplitudes of the conversion coefficients for the channels are normalized using a norm of the conversion coefficients among the channels, and wherein phases of the conversion coefficients for the channels are normalized using a total sum of the phases of the conversion coefficients among the channels.

* * * * *